(12) United States Patent
Hertz et al.

(10) Patent No.: US 7,871,734 B2
(45) Date of Patent: Jan. 18, 2011

(54) MICRO FUEL CELL

(75) Inventors: Joshua L. Hertz, Silver Spring, MD (US); Harry L. Tuller, Wellesley Hills, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 368 days.

(21) Appl. No.: 11/508,752

(22) Filed: Aug. 23, 2006

(65) Prior Publication Data

US 2007/0141445 A1 Jun. 21, 2007

Related U.S. Application Data

(60) Provisional application No. 60/710,795, filed on Aug. 23, 2005.

(51) Int. Cl.
*H01M 4/86* (2006.01)
*H01M 8/10* (2006.01)
*B05D 5/12* (2006.01)

(52) U.S. Cl. .............. 429/479; 429/481; 429/516; 427/115

(58) Field of Classification Search .......... 429/40, 429/30, 12
See application file for complete search history.

(56) References Cited

U.S. PATENT DOCUMENTS

| | | | |
|---|---|---|---|
| 4,248,941 A | 2/1981 | Louis et al. |
| 4,648,955 A | 3/1987 | Maget |
| 5,162,166 A | 11/1992 | Ellgen |
| RE34,248 E | 5/1993 | Dyer |
| 5,395,704 A | 3/1995 | Barnett et al. |
| 5,753,385 A | 5/1998 | Jankowski et al. |
| 5,905,275 A | 5/1999 | Nunoue et al. |
| 6,007,683 A | 12/1999 | Jankowski et al. |
| 6,239,033 B1 | 5/2001 | Kawai |
| 6,312,846 B1 | 11/2001 | Marsh |
| 6,541,149 B1 | 4/2003 | Maynard et al. |
| 6,645,656 B1 | 11/2003 | Chen et al. |
| 6,649,287 B2 | 11/2003 | Weeks, Jr. et al. |
| 2003/0003347 A1 | 1/2003 | D'Arrigo et al. |
| 2003/0022051 A1 | 1/2003 | Haluzak |
| 2003/0039874 A1 | 2/2003 | Jankowski et al. |
| 2003/0054222 A1 | 3/2003 | Horiuchi et al. |

(Continued)

FOREIGN PATENT DOCUMENTS

EP 1 416 559 A2 5/2004

(Continued)

OTHER PUBLICATIONS

International Search Report dated Feb. 2, 2007, International Application No. PCT/US2006/032854, Filed Aug. 23, 2006.

(Continued)

*Primary Examiner*—Dah-Wei Yuan
*Assistant Examiner*—Angela J. Martin
(74) *Attorney, Agent, or Firm*—Wolf, Greenfield & Sacks, P.C.

(57) ABSTRACT

The present invention discloses a solid oxide fuel cell and method for fabricating solid oxide fuel cells using thin film processing techniques. The fuel cell comprises a cathode layer, an electrolyte layer, and an anode layer arranged in various configurations to optimize fuel cell performance.

16 Claims, 5 Drawing Sheets

U.S. PATENT DOCUMENTS

| | | | |
|---|---|---|---|
| 2003/0165727 A1 | 9/2003 | Priestnall et al. | |
| 2003/0190505 A1 | 10/2003 | Kearl et al. | |
| 2003/0228508 A1* | 12/2003 | Champion et al. | 429/30 |
| 2004/0018406 A1 | 1/2004 | Herman et al. | |
| 2004/0076868 A1 | 4/2004 | Mardilovich et al. | |
| 2004/0086754 A1 | 5/2004 | Lazaroff et al. | |
| 2004/0197628 A1* | 10/2004 | Yoshikata et al. | 429/30 |
| 2007/0026266 A1* | 2/2007 | Pelton et al. | 429/7 |

FOREIGN PATENT DOCUMENTS

| | | | |
|---|---|---|---|
| FR | 2 846 797 A1 | | 12/2002 |
| FR | 2846797 | * | 5/2004 |
| FR | 2846797 A1 | | 5/2004 |
| JP | 2000243412 A | | 9/2000 |
| JP | 2001236970 A | | 8/2001 |
| JP | 2002280015 A | | 9/2002 |
| JP | 2002313357 A | | 10/2002 |
| JP | 2003282089 A | | 10/2003 |
| JP | 2005-174663 | * | 6/2005 |
| JP | 2005174663 | | 6/2005 |
| WO | WO 03/085761 A2 | | 10/2003 |

OTHER PUBLICATIONS

Baertsch, C. et al., "Fabrication and structural characterization of self-supporting electrolyte membranes for a micro solid-oxide fuel cell," *J. Mater. Res.* 2004, 19, 9 2604-2615.

Dyer, C.K., "A novel thin-film electrochemical device for energy conversion," *Nature* 1990, 343, 547-548.

Hibino, T. et al., "A solid oxide fuel cell with a novel geometry that eliminates the need for preparing a thin electrolyte film," ECS, *Journal of the Electrochemical Society* 2000, 149 (2), A195-A200.

Hibino, T. et al., "Improvement of a single-chamber solid-oxide fuel cell and evaluation of new cell designs," *Journal of the Electrochemical Society* 2000, 147 (4), 1338-1343.

Hibino, T. et al., "New concept for simplifying SOFC system," *Solid State Ionics* 1996, 91, 69-74.

Morse, J. et al., "A novel thin film solid oxide fuel cell for microscale energy conversion," Part of the SPIE Conference on Micromached Devices and Components V, *SPIE* 1999, 3876, 223-226.

Morse, J. et al., "Novel proton exchange membrane thin-film fuel cell for microscale energy conversation," *Journal of Vacuum Science & Technology A* 2000, 18 (4), 2003-2005.

Shao, Z. et al., "Anode-supported thin-film fuel cells operated in a single chamber configuration 2T-I-12," *Solid State Ionics* 2004, 175, 39-46.

Shiratori, Y. et al., "A novel high-voltage single-chamber SOFC with series connected cells," *Electrochemical Society Proceedings*, 2001-16, 1012-1021.

Shiratori, Y. et al., "Study of high voltage single chamber SOFC with series connected cells I. IV-IP characteristics of two segments cell," *Electrochemistry* 2001, 69(2), 92-97.

Tuller, H. et al., "Thin Films: Application to solid oxide fuel cells," $202^{nd}$ Electrochemical Society Meeting, Salt Lake City, 2002.

English Translation of French Publication No. FR 2846797 (13 pages), May 7, 2004.

* cited by examiner

US 7,871,734 B2

MICRO FUEL CELL

RELATED APPLICATIONS

This application claims priority under 35 U.S.C. §119(e) to U.S. Provisional Application Ser. No. 60/710,795, entitled "MICRO FUEL CELL," filed on Aug. 23, 2005, which is herein incorporated by reference in its entirety.

GOVERNMENT SPONSORSHIP

This invention was sponsored by the Army Research Office Grant No. DAAD-01-1-0566. The government has certain rights in the invention.

FIELD OF THE INVENTION

The present invention relates to fuel cells and particularly to microfabricated thin-film, single chamber solid oxide fuel cells, and methods for their fabrication.

BACKGROUND OF THE INTENTION

A fuel cell is an electrochemical device that can produce electricity by combining a fuel (such as hydrogen or a hydrocarbon) and an oxidant (such as pure oxygen or air) to produce electricity. Fuel cells typically include two electrodes (i.e., an anode and a cathode) that are in contact with a common electrolyte. A solid oxide fuel cell (SOFC) includes a solid-phase electrolyte and operates when an external load is connected to the anode and cathode. This results in fuel being oxidized to positively charged ions on the surface of the anode and oxygen molecules being reduced to oxygen anions on the surface of the cathode. A current flow is produced that returns electrons to the cathode. This current flow can be tapped to power electrical devices. Recently, the use of single chamber SOFCs has simplified fuel cell fabrication and operation by premixing the fuel and oxidizer gases and then delivering the mixture to the electrodes. The use of a single chamber eliminates the need for sealing between separate fuel and oxidizer chambers and reduces the number of valves, chambers, and other devices that would be needed, allowing a variety of new geometries in fuel cell design. However, production of the devices can be costly and their overall efficiency still does not meet the standards for practical use. Thus, there exists a need for fuel cells with improved performance that can be produced in large quantities at low cost.

SUMMARY OF THE INVENTION

The present invention provides microfabricated thin-film, single chamber solid oxide fuel cells, and their methods of use and fabrication.

In one aspect, the invention provides a method for making a fuel cell. The method involves depositing, on a substrate surface, a first thin film comprising a fuel cell electrolyte, a fuel cell cathode and/or a fuel cell anode; followed by depositing a second thin film in contact with the first thin film wherein the second thin film comprises a fuel cell electrolyte, a fuel cell cathode and/or a fuel cell anode and is different from the first thin film; followed by depositing a third thin film in contact with at least one of the first thin film and the second thin film wherein the third thin film comprises a fuel cell electrolyte, a fuel cell cathode, and/or a fuel cell anode and is different from the first thin film and the second thin film, to produce the fuel cell.

Another aspect of the invention provides a single chamber fuel cell comprising a substantially planar electrolyte layer with an average thickness of less than about 10 μm, a substantially planar selectively active cathode contacting the electrolyte layer and having an average thickness of less than about 10 μm, and a substantially planar selectively active anode contacting the electrolyte layer and having an average thickness of less than about 10 μm.

DETAILED DESCRIPTION OF THE INVENTION

Figure 1:
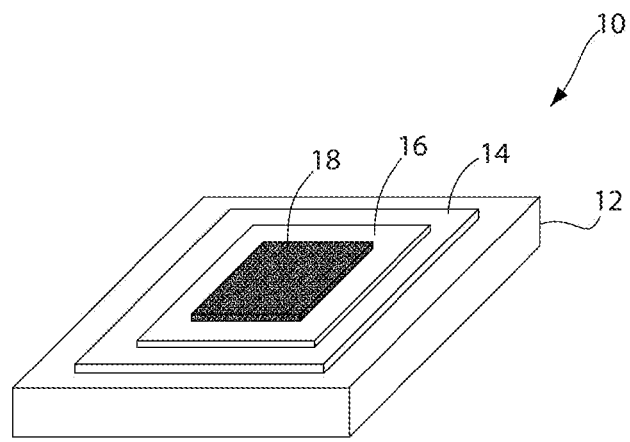
FIG. 1 illustrates, schematically, a fuel cell according to one embodiment of the invention.

The present invention relates to thin-film, single chamber solid oxide fuel cells and methods for their use and fabrication. One of the chief impediments to practical and efficient SOFC operation is a requirement for high operating temperatures (approximately 800-1000° C.). Prolonged use at high operating temperatures requires that the materials of construction possess adequate chemical and structural stability to sustain high temperatures without chemical degradation of the materials, as well as similar thermal expansion coefficients, to minimize thermal stresses that may lead to cracking and/or delamination. In one aspect, the invention provides a method for making a fuel cell using "thin-film" technology. A thin film can be formed using processes such as spin-on methods, chemical vapor deposition, pulsed laser deposition, vacuum plasma spray, wet spray, sputtering, evaporation, or molecular beam epitaxy. The use of thin-film processing may allow for the reduction of the active elements of the fuel cell to micron or sub-micron dimensions, allowing oxygen ions to pass through the device with greater ease, even at reduced operating temperatures. This can improve fuel cell performance by reducing ohmic losses across the cell. Thinner fuel cell designs operating at reduced temperatures also allow a greater variety of materials to be utilized. Fuel cells fabricated by thin film techniques may be able to provide a reliable, portable power source that addresses both economic and environmental concerns. Furthermore, a single chamber design made using thin film techniques simplifies cell fabrication and operation, making them capable of integration into microelectronics and MEMS structures. Such structures can reduce both the start-up time and the power requirements to maintain the operation temperature.

Micro-sized solid oxide fuel cells, μSOFC, in particular, hold promise for revolutionizing the means by which portable electronics are powered by offering power densities in many cases much greater than that offered by lithium batteries while allowing for improved (in some cases near instantaneous) recharging with readily available hydrocarbon fuels. In the present invention, technology involving thin solid electrolyte films coupled with, for example, Si MEMS technology can produce highly integrated systems-on-a-chip which can operate at markedly reduced temperatures. Microfabrication (e.g., via thin film processing) may enable the production of very thin, substantially pore-free, electrolyte films, which can facilitate reduced temperatures of operation. For example, for film thicknesses on the order of 0.15 microns (150 nm), yttrium-stabilized zirconium (YSZ) may operate at temperatures of about 400° C. and Gd-doped ceria may operate at temperatures of about 200° C., with relatively low requisite resistance (e.g., 0.15 ohm-cm$^2$). Additionally, although reactions which take place at the anode and the cathode may require operating temperatures typically above 600° C., the power necessary to maintain the membranes in MEMS devices at operating temperature may be reduced when compared to known SOFC devices. Furthermore, the low thermal mass of μSOFCs can result in relatively more rapid start-up times, which may be a critical feature for portable applications.

A general embodiment of a thin film, single chamber solid oxide fuel cell can include a cathode layer, an anode layer, and an electrolyte layer in contact with both electrodes. The layers may be assembled such that the electrolyte layer is placed between the cathode layer and anode layer in a stack. Alternatively, the layers may also be assembled such that the cathode layer and anode layer are placed on the same side of the electrolyte layer. FIG. 1 illustrates a single-chamber micro fuel cell of the invention. In the embodiment shown, fuel cell 10 includes a cathode layer 14 that can be formed on a substantially planar surface of substrate 12. An electrolyte layer 16 can be formed adjacent to the cathode layer 14 and can be deposited into the cathode layer 14. An anode layer 18 can be formed adjacent the electrolyte layer 16 and may be in contact with a surface of the electrolyte layer that is opposed to the surface of the electrolyte layer that is in contact with the cathode layer 14. The anode layer 18 may be deposited onto the electrolyte layer. Of course, the orientation of the components can be varied and it should be understood that there are other embodiments in which the orientation of the layers is varied such that, for example, the anode layer or the electrolyte layer is deposited first onto the substrate. In some embodiments, the cathode and/or anode and/or electrolyte layers can be deposited as thin films. In other embodiments, any layer may be porous, as further described below.

In one embodiment, the electrodes may be placed on opposite surfaces of a substantially planar electrolyte wherein the thickness of the electrolyte layer determines the distance between the electrodes. For example, FIG. 1 illustrates a substantially planar cathode layer 14 deposited first on a surface of substrate 12, followed by deposition of a substantially planar electrolyte layer 16 in contact with the cathode layer, followed by deposition of a substantially planar anode layer 18 in contact with at least the electrolyte layer 16. In another embodiment, the anode layer may first be deposited on the substrate, followed by deposition of the electrolyte layer in contact with the anode layer, followed by deposition of the cathode layer in contact with at least the electrolyte layer. By sandwiching the electrolyte layer between the cathode and the anode, the two electrodes can typically be separated by a distance shorter than in some other embodiments, for example, the distance between interdigitated electrodes. For instance, the inter-electrode separation may be less than 50 μm, less than 5.0 μm, or less than 0.5 μm. In general, the closer the two electrodes are to each other the more efficient is the production of electric current.

Figure 2:
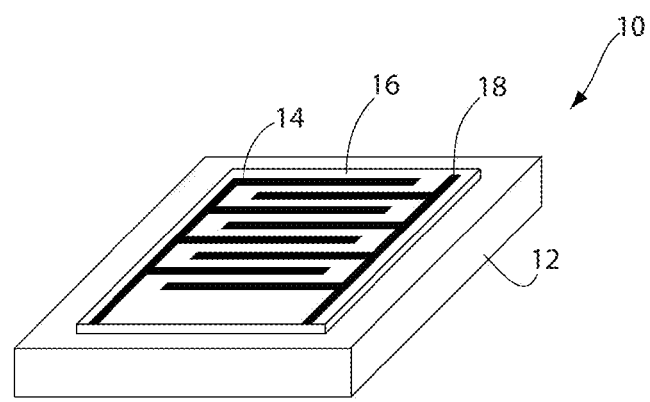
FIG. 2 illustrates, schematically, a fuel cell according to another embodiment of the invention.

In another embodiment, the electrodes may contact a common surface of a planar electrolyte. For example, FIG. 2 shows a substantially planar electrolyte layer 16 having a planar surface in contact with both a cathode 14 and an anode 18. The electrolyte 16 can be deposited first on a substrate 12, followed by deposition of the cathode layer 14 and the anode layer 16 on the same side of the electrolyte, although the order in which the components are deposited can be varied. In one embodiment, the cathode and anode are a pair of deposited interdigitated electrodes on the same side of a thin film of electrolyte, providing a large three-phase contact length between each electrode and electrolyte. An "interdigitated pair" of electrodes indicates two comb-shaped electrodes, wherein the "fingers" of each comb-shaped electrode are disposed in an alternating fashion, as shown in FIG. 2.

In other embodiments, at least one of the layers, or a portion thereof, may be deposited in a subsurface trench. A "trench," as used herein, indicates an indentation in the surface of a material. The cross-sectional shape (circular, oval, triangular, irregular, square or rectangular, or the like), number, and dimensions of the trench(es) can be varied to suit a particular application by methods known to those of ordinary skill in the art. For example, in one embodiment, the trench may be a narrow and elongated channel. In certain embodiments, at least one of the cathode and anode is deposited in a subsurface trench. In one embodiment, only the anode is deposited in a subsurface trench. In another embodiment, both the cathode and anode are deposited in a subsurface trench. Where a component such as an anode is deposited in a subsurface trench, this means that at least a portion of the component is deposited in the trench, or all of the component is deposited in the trench. That is, a portion of the component can be deposited within the trench but a remainder of the component can extend above the top of the trench, i.e., above a point flush with the surface into which trench is formed, or the entire component can reside in the trench, i.e., the component can extend only to the top of the trench and have a top surface essentially flush with the surface of the material into which the trench is formed. In another arrangement, the component (e.g., anode) only partially fills the trench and does not extend upward in the trench (in an orientation in which the trench faces upward) even to the top of the trench; flush with the surface of the material into which the trench is formed.

Figure 5:
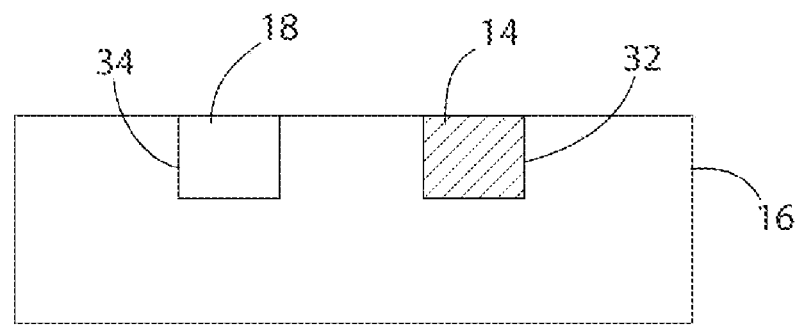
FIG. 5 shows a cross-sectional view of the active components of a fuel cell according to another embodiment of the invention.

In the illustrative embodiment shown in FIG. 5, electrolyte 16 comprises subsurface trenches 32 and 34. Cathode 14 is deposited in trench 32 and anode 18 is deposited in trench 34, such that the electrodes extend to the top of the trench and have a top surface essentially flush with the surface of electrolyte 16.

Trenches can be formed in surfaces of materials in a variety of ways in accordance with the invention, including molding of the material so as to include the trench, formation of the material followed by ablation, selective chemical etching or other removal of material to form the trench, or the like. Those of ordinary skill in the art are capable of forming such trenches in a variety of ways. Trenches of the invention can be of a variety of dimensions. In one embodiment, a trench of the invention is formed in a material at a depth of at least about 5% of the thickness of the material, and in other embodiments can be formed at a depth of at least about 10%, 20%, 25%, 30%, or 35% of the thickness of the material.

In a single chamber fuel cell, the fuel and oxidizer gases may be mixed and introduced together to the active element, eliminating the need for sealing between the fuel and oxygen chambers. Thus, a variety of new device geometries may be possible, such as one-sided, planar designs (e.g., stacked configuration of thin films), as described herein. However, the relatively small separation distances (e.g., sub-micron) between the anode layer and cathode layer may lead to overlap of the local oxygen partial pressures, thereby reducing the operating voltage of the device. Accordingly, in certain preferred embodiments, the electrodes are each substantially selective (i.e., able to retain their distinctive oxidative and reductive behavior), such that the cathode may catalyze the reduction reaction but not the oxidation reaction, while the anode may catalyze the oxidation reaction but not the reduction reaction, under the same or similar reaction conditions. In this way, fuel oxidation may occur substantially locally on the anode, producing the voltage.

The substrate 12 can be any material capable of supporting an electrolyte, an anode, a cathode, or combinations thereof. Preferably, the substrate material has a thermal coefficient of expansion similar to those of the other components of the fuel cell to promote adhesion and prevent separation of the layers at various temperatures. In some instances, materials with dissimilar thermal expansion coefficients may expand and contract at different rates and amounts with changes in temperature, which can cause stress and delamination of the layers. Examples of appropriate substrate materials may include stainless steel with or without an oxide layer, titanium, or oxides of titanium or aluminum. The substrate may comprise, for example, a semiconductor wafer or a membrane, such as a thinned membrane. In one embodiment, the substrate can consist entirely of or include a sacrificial layer. In other embodiments, the substrate may be a non-sacrificial layer. The substrate can be prepared, for example, by one of a number of micromachining methods known to those skilled in the art. Examples of such methods include, for instance, photofabrication, etching, electrodischarge machining, electrochemical machining, laser beam machining, wire electrical discharge grinding, focused ion beam machining, micromilling, micro-ultrasonic machining, and micropunching. The dimensions of the substrate may be any length, width, and thickness that is desired for a particular end use and may be rectangular, circular or otherwise shaped. In some embodiments, the substrate surface has an area of less than 1.0 $cm^2$, less than 0.1 $cm^2$, or less than 0.01 $cm^2$.

The cathode 14 performs a reduction reaction and can include any material capable of performing such a reaction. Preferably, the cathode is a selective cathode that does not perform an oxidation reaction under the same or similar reaction conditions. In some embodiments, the cathode layer is capable of reducing oxygen to $O^{2-}$ ions. The cathode layer 14 may be deposited in any geometrical form that is suitable for a particular device application. In some cases, it is preferred to maximize the potential of the fuel cell by increasing the effective length of one or both electrodes. For example, in some embodiments the cathode layer is deposited as a substantially planar, rectangular thin film. In another embodiment, the cathode layer is deposited as an interdigitated electrode or as a spiral. Examples of materials suitable for the cathode layer may include doped perovskites such as $Sm_{0.5}Sr_{0.5}CoO_3$, $Ba_{0.8}La_{0.2}CoO_3$, and $Gd_{0.5}Sr_{0.5}CoO_3$, or other materials disclosed in U.S. Patent Application Publication US2004/0076868, published Apr. 22, 2004, and incorporated herein by reference. Other well known examples include doped (e.g., Sr-doped) $LaMnO_3$, $LaFeO_3$ and $La(Co_{1-y}Fe_y)O_3$. In other embodiments, the cathode layer can include a noble metal such as platinum or gold, or another mixed ionic-electronic conductor. The cathode layer may be formed through chemical and physical routes including thin-film techniques such as spin-on methods, chemical vapor deposition, pulsed laser deposition, vacuum plasma spray, wet spray, sputtering, evaporation, molecular beam epitaxy, or any method known to those of ordinary skill in the art. In certain embodiments, the cathode layer is attached to a conductive connector or connectors for passing current. In some embodiments, the cathode layer 14 has an average thickness less than 10 µm, preferably less than 1.0 µm, and more preferably less than 0.5 µm. In some embodiments, the cathode is of a substantially consistent thickness and does not vary in thickness by more than 10, 20 or 50% across the electrode body.

The electrolyte layer 16 can be any material capable of transporting either positively or negatively charged ions or both between two electrodes and should be chemically compatible with the electrodes. In one set of embodiments, the electrolyte comprises a solid oxide that is capable of conducting oxygen ions from cathode to anode. In a particular embodiment, the electrolyte comprises a solid oxide that is capable of conducting protons from anode to cathode. The electrolyte layer 16 may be deposited in any geometrical form that is suitable for a particular device application. For example, in some embodiments the electrolyte layer is deposited as a substantially planar, thin film. A planar thin film may be of any shape and can be, for example, rectangular, circular or can be shaped to conform to an irregularly shaped substrate. In another set of embodiments, the electrolyte comprises a single crystal or polycrystalline solid. Examples of suitable electrolyte materials include, but are not limited to, samarium- or gadolinium-doped $CeO_2$, yttria stabilized zirconia, doped perovskite oxides such as $La_aSr_bGa_cMg_dO_{3-\delta}$, proton-conducting perovskites based on $BaZrO_3$, $SrCeO_3$, or $BaCeO_3$, other proton exchange ceramics, proton conductors, or other materials disclosed in U.S. Patent Application Publication US2004/0076868, published Apr. 22, 2004, and incorporated herein by reference. In one embodiment, the electrolyte can be a ceramic thin film such as yttria-stabilized zirconia or a ceria solid solution. The electrolyte layer 16 may be deposited through chemical and physical routes such as thin-film techniques including spin-on methods, chemical vapor deposition, pulsed laser deposition, vacuum plasma spray, wet spray, sputtering, evaporation, molecular beam epitaxy, or any method known to those of ordinary skill in the art. In some embodiments, the electrolyte layer 16 has a thickness less than 10 µm, preferably less than 1.0 µm, more preferably less than 0.5 µm. It may be preferred that the electrolyte is of substantially consistent thickness in order to help achieve a consistent separation between electrodes. This may be of particular interest when electrodes are positioned on opposed sides of the electrolyte.

The anode layer 18 can include any material capable of performing an oxidation reaction and is chemically compatible with the electrolyte. Preferably, the anode is a selective electrode that does not perform a reduction reaction under fuel cell conditions. In some embodiments, the anode is capable of oxidizing fuel to liberate electrons. The anode layer 18 may be deposited in any geometrical form that is suitable for a particular device application. For example, in some embodiments the anode layer is deposited as a substantially planar, thin film. The planar film may be of any shape and may be rectangular, circular or of an irregular shape. It may be shaped and positioned to maximize interaction with the cathode. In another embodiment, the anode layer can deposited as an interdigitated electrode. For instance, the electrode may be "comb shaped," as described above, or may be spiral shaped and may be nested with a similarly shaped cathode to increase interaction between the electrodes. Examples of materials that may be suitable for the anode layer include copper or nickel dispersed on ceria (e.g. $Ce_{0.8}Sm_{0.2}O_{19}$, $Ce_{0.9}Gd_{0.1}O_{19}$), mixed ionic-electronic conductors, or other materials disclosed in U.S. Patent Application Publication US2004/0076868, published Apr. 22, 2004, and incorporated herein by reference. Mixtures of these and other materials may also be used. In some embodiments, the anode may be a noble metal such as platinum or gold. In another embodiment, the anode layer is a cermet such as nickel-yttria stabilized zirconia. Use of cermets in the anode can provide the added benefit of being compatible with traditional, alcohol or petroleum-based fuels rather than purified hydrogen typically needed in fuel cells. The anode layer may be formed through chemical and physical routes including thin-film techniques such as spin-on methods, chemical vapor deposition, pulsed laser deposition, vacuum plasma spray, wet spray, sputtering, evaporation, molecular beam epitaxy, or any method known to those of ordinary skill in the art. In certain embodiments, the anode layer is attached to a conductive connector or connectors for supplying current. In some embodiments, the anode layer 18 has a thickness less than 10 µm, preferably less than 1.0 µm, more preferably less than 0.5 µm. It may also be of consistent thickness and in some cases the thickness will vary less than 50%, less than 25% or less than 10%.

In another embodiment, a buffer layer can be positioned between the substrate and the active elements. It can be deposited onto the substrate before the deposition of the electrodes and/or electrolyte. Preferably, the buffer is chemically inert to the fuel and is not easily oxidized. In one embodiment, the buffer layer can improve the degree of epitaxial growth on either the cathode or the anode. In another embodiment, the buffer layer can reduce chemical interactions with the substrate. In another embodiment, electrical and/or thermal insulation is provided by the buffer layer. Examples of materials suitable for buffer layers may include doped ceria or $CeO_2$.

In some microfabricated single chamber fuel cells, reactant gases may not be able to penetrate through dense thin films or substrates to reach the anode-electrolyte and/or cathode-electrolyte interfaces. Accordingly, in certain embodiments, a porous material (or a material altered to become porous) may be used to form or to modify at least a portion of any of the layers of the invention. As used herein, a "porous" material is defined as a material having a sufficient number of pores or interstices such that the material is easily crossed or permeated by, for example, a gas or mixture of gases. In the present invention, a porous material may improve the performance of the device by advantageously facilitating the diffusion of reactant gases to the active layers of the fuel cell, preventing the diffusion of reacted gas species from the anode to the cathode or vice-versa, and/or increasing the residence time of gaseous species at the anode. In some embodiments, the anode, cathode and/or electrolyte layer may be modified to be porous. In some embodiments, the anode and/or cathode layer is positioned beneath a porous capping layer or within a subsurface trench. In some embodiments, a porous material may advantageously facilitate the diffusion of gases to each of the active layers of the fuel cell. For example, the use of porous material may enhance fuel cell performance by providing access for the gases to the bottom layer of a fuel cell in a stacked configuration of layers. In one embodiment, the porous material is chemically inert to the fuel. In another embodiment, the porous material is chemically active to the fuel (e.g., can perform a reduction and/or an oxidation, or can transport either positively or negatively charged ions or both between two electrodes). In one embodiment, a portion or all of at least one of the cathode, anode, and electrolyte is porous. In another embodiment, both the cathode and anode are porous or include at least one porous portion. In another embodiment, the anode is partially or fully porous. In other embodiments, at least one of the cathode and anode is modified (e.g. covered or coated) with an inert, porous material (e.g., a porous capping layer). In one embodiment, the anode is covered with an inert, porous material.

Figure 6:
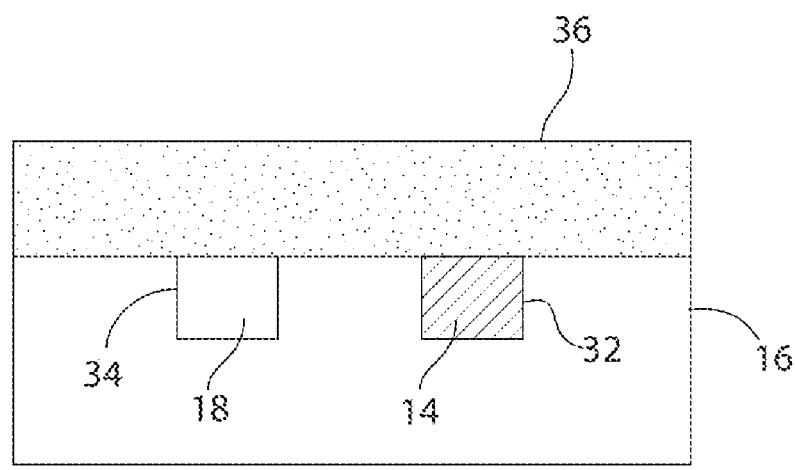
FIG. 6 shows a cross-sectional view of the active components of a fuel cell, along with a porous capping layer, according to another embodiment of the invention.

Some illustrative embodiments of possible configurations of the active layers in devices comprising porous materials are shown in FIGS. 6-11. FIG. 6 shows an embodiment wherein electrolyte 16 comprises subsurface trenches 32 and 34. Cathode 14 is deposited within subsurface trench 32, while anode 18 is deposited within subsurface trench 34. Porous capping layer 36 may be deposited on electrolyte 16 such that porous capping layer 36 covers both cathode 14 and anode 18.

Figure 7:
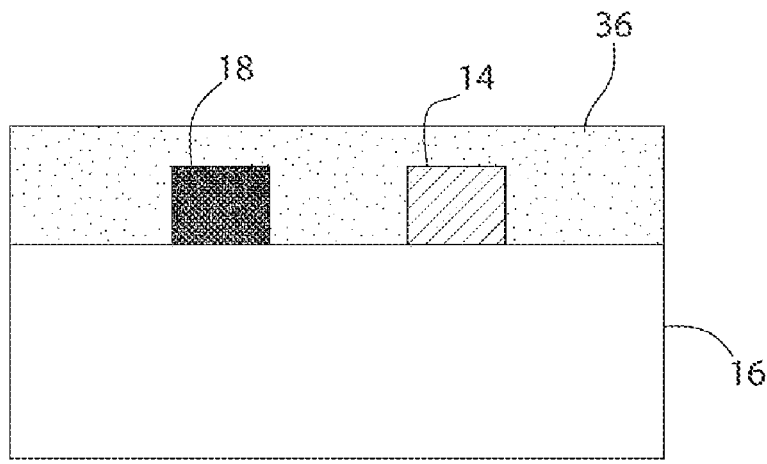
FIG. 7 shows a cross-sectional view of the active components of a fuel cell, along with a porous capping layer, according to another embodiment of the invention.

FIG. 7 shows an embodiment wherein cathode 14 and anode 18 are each deposited on separate areas of electrolyte 16 such that cathode 14 and anode 18 do not contact each other. Porous capping layer 36 may then be deposited on the electrolyte 16 such that the porous capping layer 36 covers both cathode 14 and anode 18.

Figure 8:
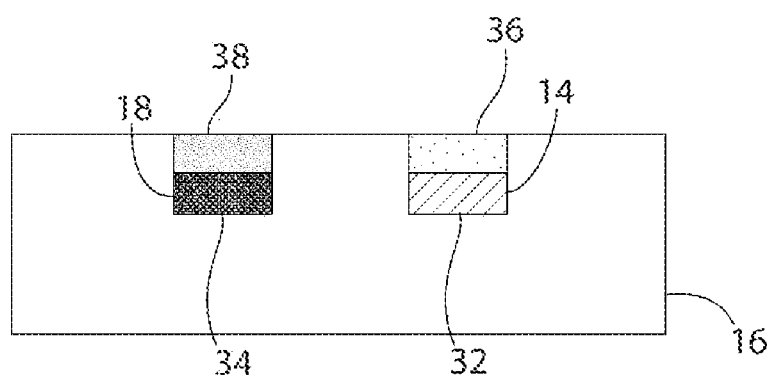
FIG. 8 shows a cross-sectional view of the active components of a fuel cell, along with two porous capping layers, according to another embodiment of the invention.

In another illustrative embodiment, electrolyte 16 comprises subsurface trenches 32 and 34 (FIG. 8). Cathode 14 may be deposited into subsurface trench 32 such that cathode 14 only partially fills the trench. Porous capping layer 36 may then be deposited into subsurface trench 32 such that it covers cathode 14 and extends to the top of subsurface trench 32, having a top surface essentially flush with the surface of electrolyte 16. Similarly, anode 18 may be deposited in subsurface trench 34 such that anode 18 only partially fills the trench. Porous capping layer 38 may then be deposited into subsurface trench 34 such that it covers anode 18 and extends to the top of subsurface trench 34, having a top surface essentially flush with the surface of electrolyte 16.

Figure 9:
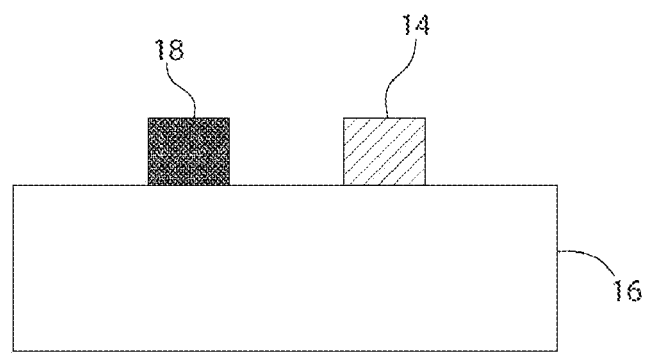
FIG. 9 illustrates, schematically, the active components of a fuel cell wherein the electrodes are porous, according to another embodiment of the invention.

Alternatively, in some embodiments, cathode 14 and/or anode 18 may be porous or modified to become porous. As shown in FIG. 9, porous cathode 14 and porous anode 18 may each be deposited on separate areas of electrolyte 16 such that porous cathode 14 and porous anode 18 do not contact.

Figure 10:
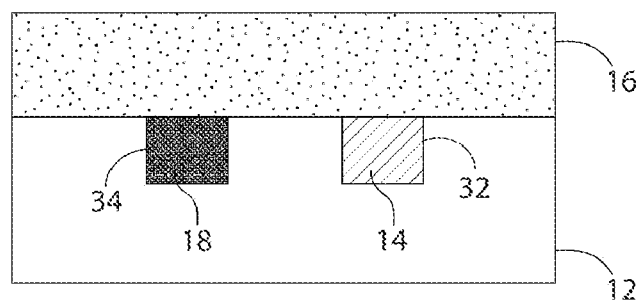
FIG. 10 illustrates, schematically, the active components of a fuel cell wherein the electrolyte is porous, according to another embodiment of the invention.
Figure 11:
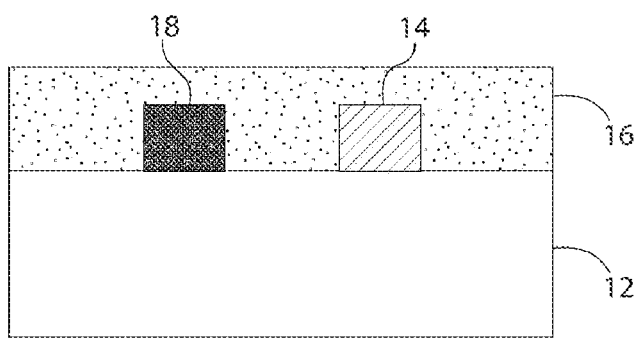
FIG. 11 illustrates, schematically, the active components of a fuel cell wherein the electrolyte is porous, according to another embodiment of the invention.

In other embodiments, an inert substrate may be used with a porous electrolyte deposited on the substrate. For example, FIG. 10 shows a substrate 12 which comprises subsurface trenches 32 and 34. Cathode 14 may be deposited within subsurface trench 32, while anode 18 may be deposited within subsurface trench 34. Each electrode may each be deposited either partially or such that it extends to the top of the trench and has a top surface essentially flush with the surface of substrate 12. A porous electrolyte 16 may then be deposited on substrate 12 such that it covers both cathode 14 and anode 18. In another embodiment, cathode 14 and anode 18 are each deposited on separate areas of substrate 12, such that cathode 14 and anode 18 do not contact (FIG. 11). Porous electrolyte 16 may then be deposited on substrate 12 such that it covers cathode 14 and anode 18.

In any embodiment, the anode and/or cathode may or may not be porous, and may or may not be placed in a subsurface trench. Additionally, the components of devices illustrated in FIGS. 1 and 2 may each be porous, or modified to become porous.

Figure 3:
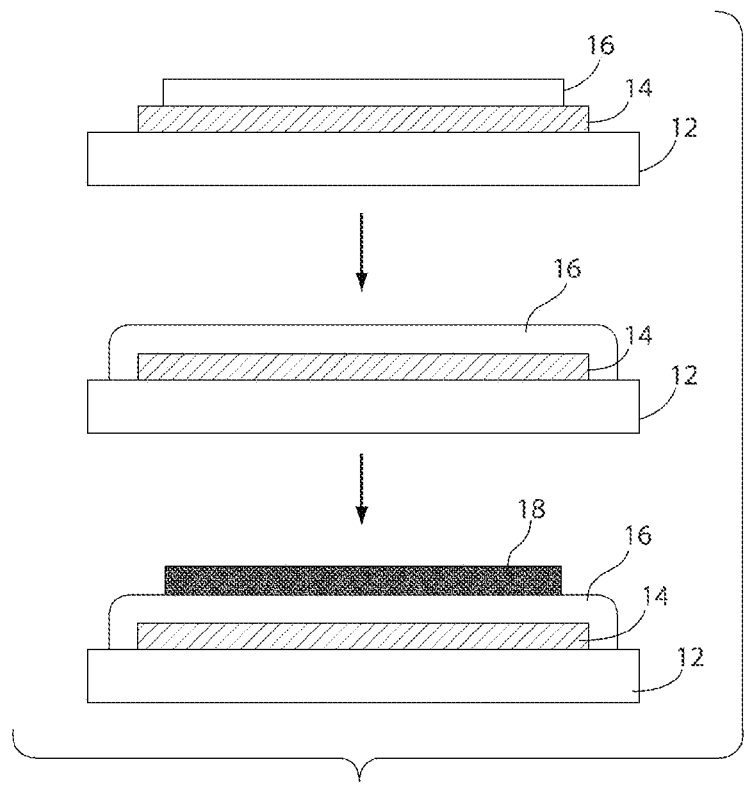
FIG. 3 shows a side-view of one embodiment of the fuel cell in various stages of fabrication.

The layers may be further optionally treated to increase the surface area (i.e., to increase ionic and/or electronic conductivity). In one embodiment, epitaxial growth of either the anode or cathode or both can increase the available surface area of a layer. "Epitaxial growth" refers to the process by which a thin layer of single-crystal material (or atoms) is deposited on a substrate. In one embodiment, the electrolyte layer 16 can be epitaxially grown to completely cover an underlying cathode layer 14, as shown in FIG. 3. The expanded electrolyte layer 16 can effectively shield the two electrodes from contact. In another embodiment, the cathode layer 14 and anode layer 18 are deposited as a pair of interdigitated electrodes on a common surface of an electrolyte layer 16, as shown in FIG. 2. Subsequent epitaxial growth of at least one of the cathode or anode layers decreases the distance between the electrodes, which can decrease ohmic resistance and increase efficiency. Methods of epitaxial growth are known to those of ordinary skill in the art. Some examples include liquid phase epitaxy, vapor phase epitaxy, molecular beam epitaxy, chemical vapor deposition, metal-organic chemical vapor deposition, atomic layer epitaxy.

Figure 4:
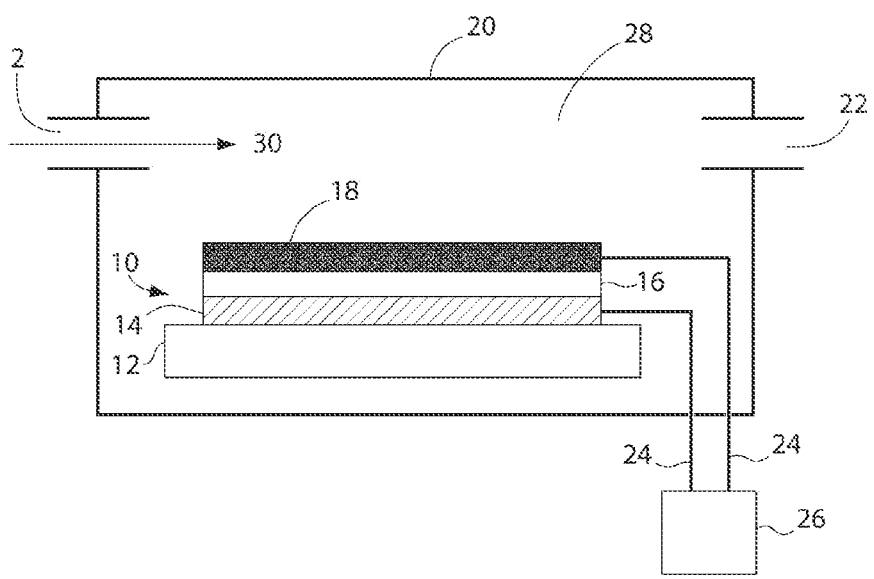
FIG. 4 shows one embodiment of a fuel cell apparatus of the invention.

As shown in the cutaway view of FIG. 4, a fuel cell apparatus may be housed in a single chamber 20 having one or more ports 22 for the introduction of fuel and/or oxidant to the apparatus and for the release of exhaust from the chamber. The fuel and oxidant can be mixed prior to delivery to chamber 20 to produce a gaseous mixture. Gas flows into the chamber via at least one port 22 into an open space 28 above fuel cell 10 in a direction 30. Connectors 24 connect the cathode 14 and anode 16 to an external load 26. The fuel cell operates when the external load 26 provides a flow of electrons to react with oxygen at the cathode layer 14, reducing the oxygen to oxygen anions. The oxygen anions then travel through the electrolyte layer 16 to anode layer 18, where the fuel becomes oxidized, liberating electrons. The combination of reduction and oxidation reactions causes a current flow between the two electrodes. Preferably, the electrodes are both selectively active. A "selectively active" cathode catalyzes the reduction reaction alone and does not catalyze the oxidation reaction. Likewise, a "selectively active" anode catalyzes only the oxidation reaction and does not catalyze the reduction reaction. In this way, fuel combustion occurs as completely as possible on the electrodes in a common chamber, producing the electro-motive force (EMF) and increasing overall efficiency. Both the cathode and anode layers may be selectively active and in contact with the electrolyte.

There are several types of fuel that can be used for a solid oxide fuel cell. Some examples of suitable fuels are hydrogen and hydrocarbons such as methane or methanol. Mixtures of compounds may also be useful.

Those skilled in the art would readily appreciate that all parameters listed herein are meant to be examples and that actual parameters will depend upon specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed:

1. A single chamber fuel cell comprising:
    a substantially planar electrolyte layer having an average thickness of less than about 10 µm;
    a substantially planar selectively active cathode contacting the electrolyte layer, the cathode having an average thickness of less than about 10 µm; and
    a substantially planar selectively active anode contacting the electrolyte layer, the anode having an average thickness of less than about 10 µm; and
    a substrate contacting at least one of the cathode, anode, or electrolyte,
    wherein at least a portion of the cathode or anode is placed in a subsurface trench, provided that, when a portion of the cathode and a portion of the anode are placed in subsurface trenches, the portion of the cathode is not placed in the same subsurface trench as the portion of the anode.

2. The fuel cell of claim 1 wherein the electrolyte comprises a solid oxide.

3. The fuel cell of claim 2 wherein the electrolyte consists essentially of a solid oxide.

4. The fuel cell of claim 2 wherein the electrolyte comprises a single crystal or polycrystalline solid electrolyte.

5. The fuel cell of claim 2 wherein the electrolyte consists essentially of a single crystal or polycrystalline solid electrolyte.

6. The fuel cell of claim 2 wherein the electrolyte layer is sandwiched between the cathode and the anode.

7. The fuel cell of claim 2 wherein the anode and cathode contact a common surface of the electrolyte.

8. The fuel cell of claim 1 wherein both the cathode and anode are porous.

9. The fuel cell of claim 1 wherein the anode is porous.

10. The fuel cell of claim 1 wherein at least one of the cathode and anode is modified with a porous material.

11. The fuel cell of claim 10 wherein the anode is modified with a porous material.

12. The fuel cell of claim 1 wherein at least a portion of the cathode and anode arc is deposited in a subsurface trench.

13. The fuel cell of claim 1 wherein at least a portion of the anode is deposited in a subsurface trench.

14. The fuel cell of claim 1, wherein at least a portion of the anode is placed in a first subsurface trench and at least a portion of the cathode is placed in a second subsurface trench different from the first subsurface trench.

15. The fuel cell of claim 1, wherein the subsurface trench is formed in the substrate.

16. The fuel cell of claim 1, wherein the subsurface trench is formed in the electrolyte.

* * * * *

UNITED STATES PATENT AND TRADEMARK OFFICE
CERTIFICATE OF CORRECTION

| | |
|---|---|
| PATENT NO. | : 7,871,734 B2 |
| APPLICATION NO. | : 11/508752 |
| DATED | : January 18, 2011 |
| INVENTOR(S) | : Joshua Hertz et al. |

It is certified that error appears in the above-identified patent and that said Letters Patent is hereby corrected as shown below:

Claim 12, Column 10, line 45, "cathode and anode arc is deposited in a subsurface trench" should be -- cathode is deposited in a subsurface trench --.

Signed and Sealed this
Thirty-first Day of May, 2011

David J. Kappos
*Director of the United States Patent and Trademark Office*